(12) United States Patent
Brooks et al.

(10) Patent No.: US 10,514,687 B2
(45) Date of Patent: Dec. 24, 2019

(54) HYBRID TRAINING WITH COLLABORATIVE AND CONVENTIONAL ROBOTS

(71) Applicants: Rodney Brooks, Cambridge, MA (US); Michael Caine, Needham, MA (US)

(72) Inventors: Rodney Brooks, Cambridge, MA (US); Michael Caine, Needham, MA (US)

(73) Assignee: RETHINK ROBOTICS GmbH, Rheinbollen (DE)

( * ) Notice: Subject to any disclaimer, the term of this patent is extended or adjusted under 35 U.S.C. 154(b) by 242 days.

(21) Appl. No.: 14/991,288

(22) Filed: Jan. 8, 2016

(65) Prior Publication Data
US 2016/0199975 A1 Jul. 14, 2016

Related U.S. Application Data

(60) Provisional application No. 62/101,165, filed on Jan. 8, 2015.

(51) Int. Cl.
*G05B 19/423* (2006.01)
*B25J 9/00* (2006.01)
(Continued)

(52) U.S. Cl.
CPC .......... *G05B 19/423* (2013.01); *B25J 9/0081* (2013.01); *B25J 9/163* (2013.01); *G05B 19/427* (2013.01); *G05B 2219/36454* (2013.01)

(58) Field of Classification Search
CPC .... B25J 9/0081; B25J 19/423; B25J 11/0005; B25J 13/084; B25J 9/0087; B25J 9/163; B25J 9/1671; B25J 9/1976; B25J 9/1697; B05J 19/42; B05J 19/423; G06F 17/00; G06K 9/2081; G06K 9/6255; G06K 9/66; G06N 99/005; G06N 5/025; G06N 7/005;
(Continued)

(56) References Cited

U.S. PATENT DOCUMENTS 4,661,032 A    4/1987  Arai
4,837,734 A *  6/1989  Ichikawa ............. G05B 19/427
                                              414/1
(Continued)

FOREIGN PATENT DOCUMENTS

EP        2384716        11/2011
JP      2010017804 A *    1/2010
(Continued)

OTHER PUBLICATIONS

Turro, "haptically augmented telecoperation", May 2001, IEEE.*
(Continued)

*Primary Examiner* — Rachid Bendidi
(74) *Attorney, Agent, or Firm* — Morgan, Lewis & Bockius LLP

(57) ABSTRACT

Systems and methods for simultaneously and economically providing high speed and precision robotic operations with operational safety include directly performing training movements of a desired task on a collaborative robot, recording data corresponding to the training movements, and transmitting the recorded data to a conventional robot to cause the conventional robot to autonomously execute the training movements in accordance with the received data.

20 Claims, 3 Drawing Sheets

(51) Int. Cl.
*B25J 9/16* (2006.01)
*G05B 19/427* (2006.01)

(58) Field of Classification Search
CPC .......... G05B 2219/39451; G05B 2219/39466; G05B 2219/40116; Y10S 901/01
See application file for complete search history.

(56) References Cited

U.S. PATENT DOCUMENTS

| | | | |
|---|---|---|---|
| 5,239,246 A * | 8/1993 | Kim | B25J 9/1633 318/560 |
| 5,382,885 A | 1/1995 | Salcudean et al. | |
| 6,272,396 B1 * | 8/2001 | Taitler | G05B 19/423 318/568.13 |
| 6,385,509 B2 | 5/2002 | Das et al. | |
| 8,600,551 B2 | 12/2013 | Itkowitz et al. | |
| 8,620,473 B2 | 12/2013 | Diolaiti et al. | |
| 9,052,710 B1 * | 6/2015 | Farwell | G05B 19/423 |
| 2004/0257021 A1 * | 12/2004 | Chang | B25J 9/1669 318/568.21 |
| 2009/0132088 A1 * | 5/2009 | Taitler | G05B 19/42 700/264 |
| 2009/0304940 A1 * | 12/2009 | Heldt | B05B 13/0431 427/427.2 |
| 2013/0218336 A1 * | 8/2013 | David | B25J 9/1671 700/248 |
| 2013/0345875 A1 * | 12/2013 | Brooks | B25J 9/0087 700/259 |
| 2014/0046128 A1 | 2/2014 | Lee et al. | |
| 2014/0163730 A1 * | 6/2014 | Mian | B25J 9/16 700/248 |
| 2018/0243910 A1 * | 8/2018 | Hashimoto | B23P 19/04 |

FOREIGN PATENT DOCUMENTS

| | | | |
|---|---|---|---|
| JP | 2010162687 | * | 7/2010 |
| JP | 5004108 | | 8/2012 |

OTHER PUBLICATIONS

English Translation for Reference JP2010162687.*
English Translation for reference JP2010017804A (Year: 2010).*
Rekleitis, I.M., et al., "Multi-robot cooperative localization: a study of trade-offs between efficiency and accuracy", http://ieeexplore.ieee.org/xpls/abs_all.jsp?arnumber=1041676 (abtract only).
Schmitz, A., et al., "Methods and Technologies for the Implementation of Large-Scale Robot Tactile Sensors", http://ieeexplore.ieee.org/xpls/abs_all.jsp?arnumber=5771603 (abstract only).

* cited by examiner

HYBRID TRAINING WITH COLLABORATIVE AND CONVENTIONAL ROBOTS

CROSS-REFERENCE TO RELATED APPLICATION

This application claims priority to, and the benefits of, U.S. Ser. No. 62/101,165, filed on Jan. 8, 2015, the entire disclosure of which is hereby incorporated by reference.

FIELD OF THE INVENTION

Embodiments of the present invention generally relate to training robotic systems including at least one collaborative robot that operates safely in proximity to human workers and one conventional robot that is unsafe in proximity to human workers.

BACKGROUND

Robots have been deployed across numerous industrial and manufacturing environments to promote reliability and cost savings. For example, a robotic arm can move objects to perform tasks, including assembly, packaging, inspection, etc. Conventional industrial robots are generally quite stiff, fast, and precise; these characteristics, particularly speed and stiffness, may cause danger to human workers. As a result, conventional industrial robots are typically separated from human workers by, for example, cages, barriers or sensors that can detect the presence of human workers. The separation poses challenges for training the robots, often requiring non-intuitive training sequences carried out at a distance.

Recently, a new class of robots that can work collaboratively with human workers has been developed. These collaborative robots are generally more compliant, contain integral sensing, and move at speeds designed not to pose a hazard to nearby human workers. These collaborative robots are also easier to program because a human worker may be able to teach a task by directly manipulating the robots. However, the same characteristics, i.e., compliance and safe speeds, often compromise the ability to perform a manipulative task; performance metrics such as speed and/or precision generally favor conventional robots.

While it may be possible to utilize both types of robot on a single manufacturing floor (e.g., by partitioning floor space so that the conventional robots cannot come into contact with humans), the practicalities of implementing a working "hybrid" line involving conventional and collaborative robots are considerable. While collaborative robots are expressly designed for easy training by an operator, conventional robots must be trained separately and, as noted above, using more cumbersome techniques. Until this barrier to effective combined use of collaborative and conventional robots is overcome, the ability to use them in a hybrid configuration will remain limited, and the difficulty of training conventional robots will remain.

SUMMARY

In various embodiments, the present invention relates to systems and methods for simultaneously and economically combining the high speed and precision operations of conventional robots with the operational safety and flexibility of collaborative robots, but without the need for separate training procedures. In one implementation, a robotic system includes a collaborative robot that can be directly manipulated for training purposes by a human worker; data corresponding to the training movements is recorded during the manipulation. The collaborative robot transmits the recorded data to a conventional robot, which mimics the training movements in accordance with the received data. Because data transmission may occur after or during manipulation of the collaborative robot, the conventional robot may execute the training movements, thereby performing the desired task, after or while the collaborative robot is trained. In some embodiments, the operator trains both types of robot simultaneously (e.g., directly trains the collaborative robot and indirectly trains the conventional robot at the same time), and the learned tasks may be carried out on the conventional robots at higher speed with greater precision. Kinematic equivalence mapping between the appendages of the collaborative and conventional robots effectively permits a human to train, via a collaborative robot, a conventional robot that would otherwise require a "hands off" training sequence. Accordingly, the current invention carries the benefits of direct manipulative training to robots that otherwise cannot be approached safely.

Accordingly, in one aspect, the invention pertains to a system including two or more robots, each having one or more appendages. In various embodiments, a first robot in the system is safely operable proximate to human workers but a second robot is not safely operable proximate to human workers. Additionally, the first robot includes a first communication module, a first robotic controller, and a training module, and the second robot includes a second communication module and a second robotic controller. The training module is configured to computationally record digital data corresponding to training movements manually executed on the first robot appendage; and cause transmission, via the first communication module, of the digital data to the second communication module. The second robot controller is responsive to the digital data and causes the second robot to autonomously execute the training movements. In one implementation, the first robot further includes one or more sensors, such as a force sensor, a torque sensor, a speed sensor, and/or a position sensor, and the training module is responsive thereto.

In one embodiment, the training movements include movements of a robot appendage. The second robot controller is configured to store the digital data for repeated autonomous execution of the training movements. In addition, the second robot controller may be configured to retrieve the digital data at a later time after the training movements are performed and thereafter cause the second robot appendage to execute the training movements. Alternatively, the second robot controller may be configured to cause the second robot appendage to execute the training movements in real-time as the first robot appendage is manipulated. In various embodiments, an appendage of the second robot has fewer degrees of freedom than a user-manipulated appendage of the first robot.

Additionally, the first robot may include a haptics module configured for providing haptic feedback as the appendage is manipulated. In such embodiments, the second robot controller is configured to continuously and in real-time analyze incoming digital data and cause transmission of a signal to the first robot if the second robot is incapable of executing a manipulation represented by the digital data; the first robot controller is then responsive to the signal to cause the haptics module to exert resistive force against manipulations that the second robot is incapable of executing.

In another aspect, the invention relates to a method for training a robotic system having two or more robots, where a first robot is safely operable proximate to human workers and a second robot is not safely operable proximate to human workers. In various embodiments, the method includes manually executing training movements on the first robot; computationally recording digital data corresponding to the training movements; transmitting the digital data to the second robot; and causing the second robot to autonomously execute the training movements in accordance with the received digital data.

The training movements may include movements of a robot appendage. The method may include storing the digital data for repeated autonomous execution of the training movements in the second robot. In one embodiment, the digital data is retrieved at a later time after the training movements are performed and thereafter the second robot appendage executes the training movements. In another embodiment, the second robot appendage executes the training movements in real-time as the first robot appendage is manipulated.

In various embodiments, the method includes detecting initiation of the training movements. The method further includes continuously and in real-time analyzing incoming digital data on the second robot and causing transmission of a signal to the first robot if the second robot is incapable of executing a manipulation represented by the digital data; and, in response to the signal, causing the first robot to provide haptic feedback (e.g., a resistive force against manipulations) as the appendage is manipulated.

Another aspect of the invention relates to a system including a first robot having one or more appendages and multiple second robots, where the first robot is safely operable proximate to human workers and the second robots are not safely operable proximate to human workers. In some embodiments, the first robot includes a first communication module; a first robotic controller; a selection module for selecting one of the second robots; and a training module configured to (a) computationally record digital data corresponding to training movements manually executed on the first robot appendage; and (b) cause transmission, via the first communication module, of the digital data to the selected second robot. In addition, each of the second robots includes a second communication module and a second robotic controller configured to continuously and in real-time analyze incoming digital data and cause transmission of a signal to the first robot if the second robot is incapable of executing a manipulation represented by the digital data. The selection module is configured to respond to the signal by selecting a different second robot and transmitting the digital data thereto. The first robot may further include a database of movement capabilities associated with each of the second robots, and the selection module is configured to select the different second robot based at least in part on the database.

In yet another aspect, the invention pertains to a method for training a robotic system having a first robot and one or more second robots, where the first robot is safely operable proximate to human workers and the second robot(s) is(are) not safely operable proximate to human workers. In various embodiments, the method includes manually executing training movements on the first robot; computationally recording digital data corresponding to the training movements; selecting one of the second robots; transmitting the digital data to the selected second robot; continuously and in real-time analyzing the digital data and determining whether the selected second robot is capable of executing a manipulation represented by the digital data; if so, causing the selected second robot to autonomously execute the training movements in accordance with the received digital data; and if not, causing the second robot to transmit a signal to the first robot, and in response to the signal, causing the first robot to select a different second robot and transmitting the digital data thereto. Additionally, the method may further include storing, in the first robot, a database of movement capabilities associated with each of the second robots; the selection of the second robot is based at least in part on the database.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
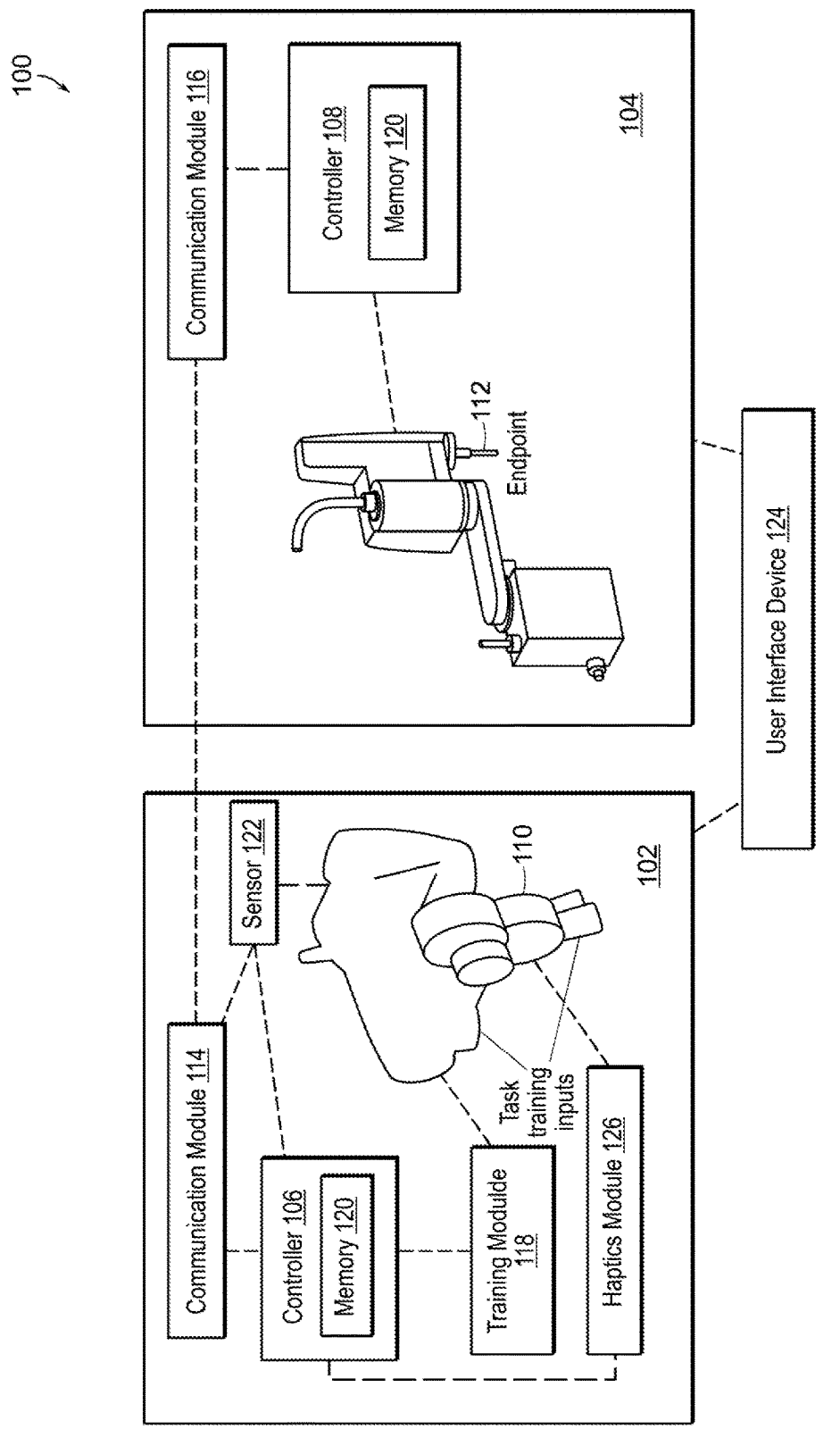
FIG. 1 schematically illustrates a hybrid robotic system combining a collaborative robot and a conventional robot in accordance with various embodiments of the present invention.

Refer first to FIG. 1, which illustrates an exemplary embodiment of a hybrid robotic system 100 combining hands-on training with the high-speed, high-precision operations associated with conventional robots. In various embodiments, the robotic system 100 includes at least one collaborative robot 102 that is safe to operate near human workers and at least one conventional robot 104 that is unsafe to operate near the workers. Each of the robots 102, 104 has a controller 106, 108 for controlling movement and at least one appendage 110, 112 (e.g., an arm) thereon for performing a desired task (e.g., lifting heavy objects, performing repetitive tasks, moving heavy objects from one location to another, activating and operating tools, etc.) under the control of the associated controller 106, 108. The collaborative and conventional robots 102, 104 may be operated in close proximity (e.g., co-located on a single platform) or remotely located from each other (e.g., at a distance of a few meters to hundreds of meters). They may communicate via wired or wireless communication modules 114, 116 employed therein. A wired communication module 114, 116 may include a wired cable and/or a fiber optic cable; a wireless communication module may implemented one or more wireless communication standards such as Bluetooth, an IEEE standard (e.g., 802.11x, 802.15x, or 802.16x), etc. It should be understood that any type of wired or wireless communication modules that allow data transmission between the collaborative and conventional robots 102, 104 are within the scope of the present invention.

To teach the robotic system 100 to perform a desired task, a human worker may first directly, manually perform training movements on the appendage 110 (e.g., moving the appendage) of the collaborative robot 102. The length of the appendage 112 of the conventional robot 104 may be equivalent to or longer or shorter than that of the user-manipulated appendage 110, depending on the intended functions that the robotic system 100 is designed to perform, as well as design considerations such as cost, weight, speed, and motor control.

In some embodiments, the collaborative robot 102 includes a training module 118 to record, in a computer memory, data corresponding to the training movements performed on the robot 102 by the human worker and simultaneously or subsequently cause the recorded data to be transmitted, via the communication modules 114, 116, to the conventional robot 104. Suitable formats for representing, and hardware and techniques for recording, data corresponding to robot movements during training is well-known in the robotics art; see, e.g., U.S. Pat. Nos. 8,965,580 and 6,654,666, the entire disclosures of which are hereby incorporated by reference.

Upon receiving the recorded data, the controller 108 of the conventional robot 104 activates the conventional robot 104 and moves its appendage 112 to autonomously execute the training movements in accordance with the recorded data. Accordingly, the collaborative appendage 110 in this approach is configured as a user-manipulated "master" appendage, whereas the conventional appendage 112 is configured as a "slave" appendage that can execute the training movements in real-time as the collaborative robot appendage 110 is manipulated or thereafter. Embodiments of the current invention thus provide human workers a safe environment by avoiding direct interactions between the human workers and the unsafe conventional robot 104 while facilitating indirect training thereof via the collaborative robot 102. In addition, the human workers may monitor movements of the slave appendage 112 via visualization or detection using a sensor during manipulation of the master appendage 110, and dynamically adjust manipulation of the collaborative robot appendage 110 based thereon. In this way, human workers receive real-time manipulation feedback directly from the unsafe conventional robot's performance.

The controllers 106, 108 may be provided as either software, hardware, or some combination thereof. For example, they may be implemented on one or more server-class computers, such as a PC having a CPU board containing one or more processors such as the CORE PENTIUM or CELERON family of processors manufactured by Intel Corporation of Santa Clara, Calif. and POWER PC family of processors manufactured by Motorola Corporation of Schaumburg, Ill., ARM processors supplied by various manufacturers under licenses, and/or the ATHLON line of processors manufactured by Advanced Micro Devices, Inc., of Sunnyvale, Calif. In various embodiments, at least one of the controllers 106, 108 includes a main memory unit 120 for storing the recorded data corresponding to the training movements executed on the collaborative robot 102; this allows the conventional robot 104 to retrieve the stored data and autonomously execute the training movements in a repeated manner without the need for the human worker to manipulate the collaborative robot 102 again. The memory may include computer storage media in the form of volatile and/or nonvolatile memory such as random-access memory (RAM), read-only memory (ROM), and/or FLASH memory residing on commonly available hardware such as one or more application-specific integrated circuits (ASIC), field-programmable gate arrays (FPGA), electrically erasable programmable read-only memories (EEPROM), programmable read-only memories (PROM), or programmable logic devices (PLD). In some embodiments, the programs are provided using external RAM and/or ROM such as optical disks, magnetic disks, as well as other commonly used storage devices.

For embodiments in which the controllers 106, 108 are implemented in software, the program may be written in any of a number of high level languages such as FORTRAN, PASCAL, JAVA, JAVASCRIPT, C, C++, LISP, PERL, BASIC, PYTHON or any suitable programming language. Additionally, the software can be implemented in an assembly language and/or machine language directed to the microprocessor resident on a target device.

In some embodiments, the collaborative robot 102 offers two modes of operating the user-manipulated appendage 110: the first mode enables the appendage 110 to be directly manipulated by the human worker and the second mode allows the appendage 110 to directly communicate with and/or train the slave appendage 112 of the conventional robot 104. Switching between two modes may be controlled by the controller 106 upon receiving a command (e.g., via touch, voice or other conventional interface) from the human worker. Alternatively, the collaborative robot 102 may include one or more sensors 122, such as a force sensor, a torque sensor, a speed sensor, and/or a position sensor, to detect presence of the worker's manipulation and consequently switch operational modes of the appendage 110 based thereon. For example, upon the sensor 122 detecting a movement of the appendage 110 above a threshold value, the controller 106 causes the appendage 110 to assume the worker-manipulation mode and the training module 118 automatically starts to record digital data representative of the movement performed on the appendage 110. In some embodiments, the controller 106 causes the communication module 114 to transmit the recorded digital data to the communication module 116 of the conventional robot 104, in response, the conventional robot 104 autonomously, in real-time, executes the training movements. In other embodiments, after receiving the recorded digital data, the controller 108 of the conventional robot 104 stores the recorded data in a task memory. The data can be retrieved as desired at a later time to cause the slave appendage 112 to execute the training movement based on the retrieved data. The task memory may be apart of the main memory unit 120 in the controller 108 or a memory external to the controller 108.

The slave appendage 112 on the conventional robot 104 may be kinematically equivalent or mapped to the user-manipulated appendage 110 on the collaborative robot 102. This allows the human worker to intuitively control the slave appendage 112 via interfacing with the user-manipulated appendage 110. The slave appendage 112 may include the same or fewer degrees of freedom (DOF) than the user-manipulated appendage 110. If the DOF of the collaborative user-manipulated appendage 110 and slave appendage 112 are different, in one embodiment, the effective kinematics of the collaborative user-manipulated appendage 110 is mapped and/or constrained to match those of the slave appendage 112. If the user-manipulated appendage 110 is mapped to the slave appendage 112, then the appendage 110 is operable in the usual fashion but only those movements kinematically achievable by the slave appendage are sent to (or stored by) the controller 108 of the conventional robot 104. The user may be allowed to manipulate the appendage 110 using all of its available DOF, and the data corresponding to the movements are processed or filtered for compatibility with the slave appendage 112; so long as the slave appendage 112 is able to achieve important waypoints and/or endpoints of the trained movement, further communication with the user (as discussed below) may be unnecessary. If, on the other hand, the user-manipulated appendage 110 is constrained to the slave appendage 112, then the controller 106 allows the user-manipulated appendage to perform only those movements within the kinematic capabilities of the slave appendage; in this way, there will be no mismatch between the manipulations performed by the collaborative robot's trainer and the response of the conventional robot. For example, a 7-DOF collaborative appendage 110 may be kinematically constrained using conventional software to mimic the constrained motions of a 4-DOF slave appendage 112. The DOF of the collaborative user-manipulated appendage 110 and slave appendage 112 may vary, depending on the design and operational needs of the collaborative and/or conventional robot. For example, a less-expensive model of the collaborative user-manipulated arm 110 having only five DOF may be sufficient to train a conventional robotic arm 112 having only three DOF to perform a simple task.

In some embodiments, the relative motion between the user-manipulated master appendage 110 and slave appendage 112 is scaled to allow relatively imprecise gross motions of the user-manipulated appendage 110 to prescribe relatively fine motions of a slave appendage 112. For example, the human worker may roughly manipulate the master appendage 110 to demonstrate how the desired task is performed, and observe the slave robot 104 as it replicates the movement as best it can. The user may employ an external control device (e.g., a tablet computer or a teach pendant in wired or wireless communication with one or both of the robots 102, 104) implementing a user interface 124 to finely manipulate (i.e., nudge) the slave appendage 112 to an accurate location; the slave controller 108 records the user-prescribed deviations into its task memory. Alternatively, the user may employ the user interface 124 to teach the conventional robot 104 to use on-board vision capabilities to discern the proper location for task performance; once again, the resulting performance sequence is stored in the task memory of the conventional robot 104.

In an alternative embodiment, the user interface device 124 is removably attached to a mount that allows the device to be viewed "hands-off" during training of the collaborative robot 102 and/or monitoring task performance of the conventional robot 104. In still another alternative, the user interface device 124 is attached to the collaborative robot as a "head" with which the human worker interacts during training and/or task monitoring.

During a training procedure, the controller 108 of the conventional robot 104 may continuously and in real-time analyze incoming digital data received from the collaborative robot 102. If the conventional robot 104 is incapable of executing a manipulation represented by the digital data (e.g., incapable of kinematically reaching key waypoints and/or endpoints), the controller 108 may cause the communication module 116 to transmit a signal to the collaborative robot 102. In various embodiments, the collaborative robot 102 includes a conventional haptics module 126, which responds to this signal and provides haptic feedback to the human worker during manipulation of the appendage 110. For example, when the communication module 114 of the collaborative robot 112 receives the signal indicating that the training movements are beyond the capabilities of the conventional robot 104, the haptics module 126 may cause the appendage 110 to exert a resistive force against human manipulations consistent with the kinematic capabilities of the conventional robot 104 (i.e., preventing movements that the conventional robot cannot carry out). Upon feeling the resistive force, the human worker may stop the training process or modify training movements of the collaborative appendage 110 in a manner compatible with the conventional robot 104.

Figure 2:
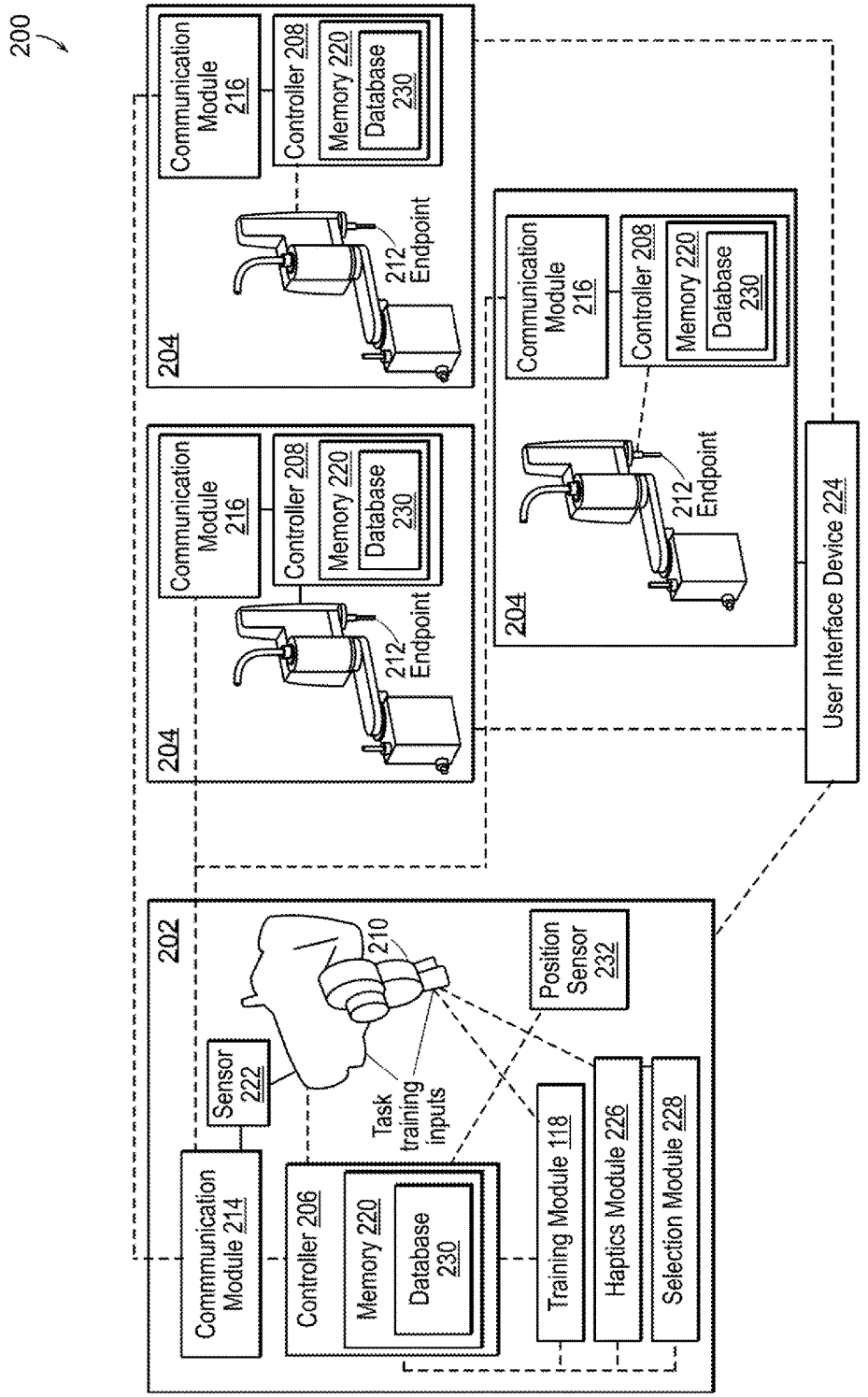
FIG. 2 schematically depicts a robotic system including one collaborative robot and multiple unsafe conventional robots in accordance with various embodiments of the present invention.

Referring to FIG. 2, in various embodiments, a robotic system 200 includes one collaborative robot 202 and multiple unsafe conventional robots 204 having different kinematic configurations (such as different movement capabilities and different abilities to reach a given location in workspace). The robots 202, 204 may include various elements, such as controllers 206, 208, appendages 210, 212, communication modules 214, 216, a training module 218, a main memory unit 220, a sensor 222, a user interface device 224, and/or a haptics module 226, as described above with regard to the robotic system 100. In addition, the collaborative robot 202 may include a selection module 228 for selecting a conventional robot 204 and/or requesting the communication module 214 of the collaborative robot 202 to transmit to the selected conventional robot 204 the digital data associated with training movements manually executed on the collaborative appendage 210.

In one embodiment, the collaborative robot 202 further includes a database 230 in the memory unit 220 for storing movement capabilities (e.g., a kinematic specification) associated with each of the conventional robots 204; the selection module 228 can then select the optimal conventional robot 204 based on data stored in the database 230 and required movements of the desired task. In another embodiment, the selection module 228 selects the conventional robot 204 based on the real-time performance thereof. For example, the collaborative robot 202 may include a position sensor 232 (such as passive infrared detectors (PIRs), Doppler microwave sensors, ultrasonic rangefinders, scanned laser rangefinders, vision-based systems, pressure-sensitive mats, or arrays of infrared emitter/detector pairs) that detects the present location of each conventional robot 204 and the location associated with the task to be performed; based on the relative locations between the task and conventional robots 204, the selection module 228 may first select the conventional robot 204 that is closest to the task. When the selected conventional robot 204 receives the signal, the controller 208 thereof may analyze the signal and activate the slave appendage 222 to perform the training movements in real-time. Whether the selected robot 204 is capable of executing the training movements may then be determined based on the robot's real-time performance. If the selected robot 204 is incapable of executing the training movements, the controller 208 may cause the communication module 216 to transmit a signal to the collaborative robot 202. Once the collaborative robot 202 receives this signal, the selection module 228 may select the conventional robot 204 that is second closest to the task for executing the training movements. Alternatively, the conventional robot 204 may include a database 230 for storing data indicating movement capabilities thereof. Upon receiving the recorded data transmitted from the collaborative robot 202, the controller 208 of the selected conventional robot 204 may compare the received data with data stored in the database 230 to determine whether the selected robot 204 is capable of performing the task. If not, the controller 208 may, again, transmit a signal to the collaborative robot 202 to allow another conventional robot 204 to be selected.

Figure 3:
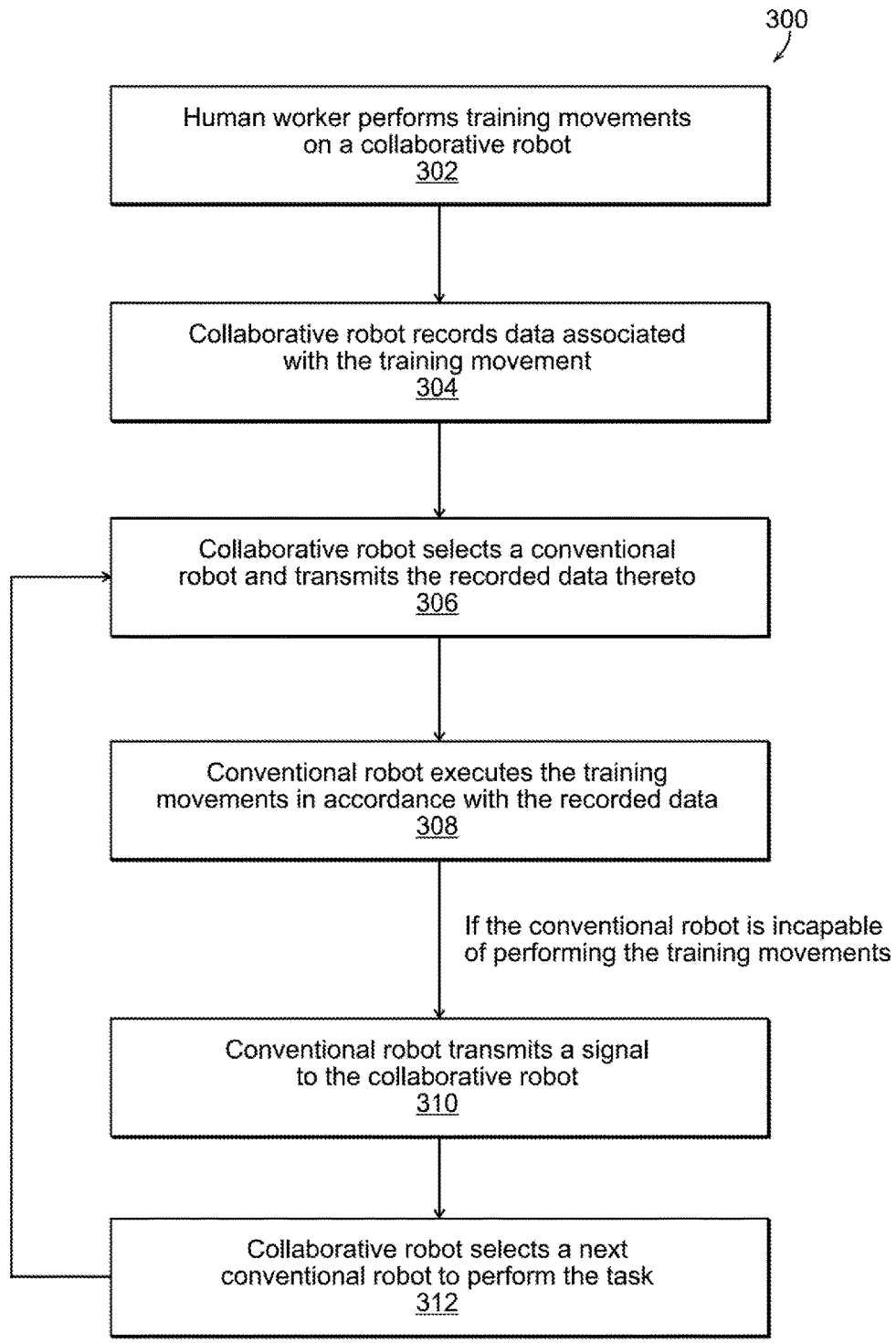
FIG. 3 is a flowchart depicting a representative method for training a robotic system including a collaborative robot and at least one conventional robot for performing a desired task in accordance with various embodiments of the present invention.

A representative method 300 for training a robotic system including at least one collaborative robot and one conventional robot for performing a desired task is depicted in FIG. 3. In a first step 302, a human worker manually performs training movements associated with the desired task on an appendage of the collaborative robot. In a second step 304, the collaborative robot computationally records data corresponding to the training movements executed thereon. In a third step 306, the collaborative robot simultaneously or subsequently transmits the recorded data to the conventional robot. In a fourth step 308, upon receiving the data, the conventional robot moves its appendage to autonomously execute the training movements based on the data. If, however, the conventional robot determines that it is incapable of performing the training movements, the conventional robot transmits a signal so indicating to the collaborative robot (in a fifth step 310). In some embodiments, upon receiving the signal, the collaborative robot selectively transmits the recorded data associated with the training movements to a second conventional robot for performing the task (in a sixth step 312). Steps 306-312 may be repeated until a conventional robot is found to successfully execute the training movements.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A system comprising:
   a. at least two robots each having an appendage associated therewith, a first robot being safely operable proximate to human workers and a second robot not being safely operable proximate to human workers;
   b. in the first robot, a first communication module, at least one sensor for detecting movement of the appendage associated with the first robot, a first robotic controller in communication with the at least one sensor and configured to control the movement of the appendage associated with the first robot to perform a task, and a haptics module configured for providing haptic feedback as the appendage of the first robot is manipulated;
   c. a second communication module and a second robotic controller in the second robot; and
   d. a training module in the first robot and responsive to the at least one sensor, the training module being configured to:
      (i) upon the first robotic controller determining presence of the movement of the appendage associated with the first robot, automatically computationally record digital data corresponding to training movements manually executed on the appendage associated with the first robot; and
      (ii) cause transmission, via the first communication module, of the digital data to the second communication module,
   wherein the second robot controller is (A) responsive to the digital data and (B) configured to continuously and in real-time analyze the digital data, and causes (A) the second robot to autonomously execute the training movements via the appendage associated with the second robot and (B) transmission of a signal to the first robot when the second robot is incapable of executing a manipulation represented by the digital data, the first robot controller being responsive to said signal to cause the haptics module to exert resistive force against manipulations that the second robot is incapable of executing.

2. The system of claim 1, wherein the training movements manually executed on the appendage associated with the first robot comprise movements of the appendage associated with the first robot.

3. The system of claim 2, wherein the second robot controller is configured to store the digital data for repeated autonomous execution of the training movements via the appendage associated with the second robot.

4. The system of claim 3, wherein the second robot controller is configured to retrieve the digital data at a later time after the training movements are performed and thereafter cause the second robot appendage to execute the training movements via the appendage associated with the second robot.

5. The system of claim 2, wherein the second robot controller is configured to cause the appendage associated with the second robot to execute the training movements in real-time as the appendage associated with the first robot is manipulated.

6. The system of claim 1, wherein the at least one sensor is at least one of a force sensor, a torque sensor, a speed sensor, or a position sensor.

7. The system of claim 1, wherein, when the training movements comprise movements not kinematically achievable by the appendage of the second robot, the training module is configured to computationally record the digital data corresponding only to training movements that are kinematically achievable by appendage of the second robot.

8. The system of claim 1, wherein, when the training movements comprise movements not kinematically achievable by the appendage of the second robot, the second robot is configured to store only portions of the digital data corresponding to training movements that are kinematically achievable by appendage of the second robot.

9. A method for training a robotic system comprising at least two robots, a first robot being safely operable proximate to human workers and a second robot not being safely operable proximate to human workers, each of the first and second robots having an appendage and a controller associated therewith, the method comprising:
   manually executing training movements on the first robot, the training movements comprising robot-appendage movements;
   detecting movement of the appendage associated with the first robot;
   when the controller associated with the first robot determines presence of the movement of the appendage associated with the first robot, automatically computationally recording digital data corresponding to the training movements;

transmitting the digital data to the second robot;

continuously and in real-time analyzing the digital data on the second robot;

causing the second robot to autonomously execute the training movements in accordance with the received digital data;

causing transmission of a signal to the first robot when the second robot is incapable of executing a manipulation represented by the digital data; and in response to the signal, causing the first robot to provide haptic feedback as the appendage associated with the first robot is manipulated.

10. The method of claim 9, further comprising storing the digital data for repeated autonomous execution of the training movements in the second robot.

11. The method of claim 10, further comprising retrieving the digital data at a later time after the training movements are performed and thereafter causing the appendage associated with the second robot to execute the training movements.

12. The method of claim 9, further comprising causing the appendage associated with the second robot to execute the training movements in real-time as the appendage associated with the first robot is manipulated.

13. The method of claim 9, further comprising detecting initiation of the training movements.

14. The method of claim 9, wherein the haptic feedback comprises a resistive force against manipulations.

15. A method for training a robotic system comprising a first robot that is safely operable proximate to human workers and a plurality of second robots that are not safely operable proximate to human workers, wherein each of the second robots has a different kinematic configuration, the method comprising:

(a) manually executing training movements on the first robot;

(b) using a controller to computationally record digital data corresponding to the training movements;

(c) causing the controller to select one of the second robots, each of the second robots being functional;

(d) transmitting the digital data to the selected second robot;

(e) causing the controller to continuously and in real-time analyzing the digital data received by the selected second robot and determining whether the selected second robot is capable of executing all of the manipulations represented by the digital data;

(f) upon determination that the selected second robot is incapable of executing all of the manipulations represented by the digital data, causing the second robot to transmit a signal to the first robot, and in response to the signal, (i) causing the first robot to select a different second robot having a different kinematic configuration from the kinematic configuration of the second robot selected in step (c) and transmitting the digital data thereto, and (ii) causing a haptics module associated with the first robot to provide haptic feedback as the training movements on the first robot are manually executed; and (g) upon determination that the selected second robot is capable of executing all of the manipulations represented by the digital data, causing the selected second robot to autonomously execute the training movements in accordance with the received digital data.

16. The method of claim 15, further comprising storing, in the first robot, a database of movement capabilities associated with each of the second robots, the selection of the second robot being based at least in part on the database.

17. The system of claim 1, wherein the second robot is configured to operate at a speed hazardous to human workers, and the first robot is configured to operate only at speeds not hazardous to human workers.

18. The method of claim 15, wherein each of the second robots is configured to operate at a speed hazardous to human workers, and the first robot is configured to operate only at speeds not hazardous to human workers.

19. The method of claim 15, wherein (i) the training movements comprise robot-appendage movements, and (ii) appendages of the second robots have fewer degrees of freedom than an appendage of the first robot that is manually manipulated to execute the training movements.

20. The method of claim 15, wherein the different kinematic configurations comprise at least one of different movement capabilities or different abilities to reach a location.

* * * * *